June 26, 1951  H. H. CHERRY  2,558,671
VALVE ASSEMBLY WITH SPHERICAL SHAPED VALVE ELEMENT HAVING
A PASSAGE THERETHROUGH FOR COLLAPSIBLE TUBES
Filed July 17, 1947  2 Sheets-Sheet 1

Inventor
Henry H. Cherry
By
E. V. Hardway
Attorney

Inventor
Henry H. Cherry.
By
E. V. Hardway.
Attorney

Patented June 26, 1951

2,558,671

UNITED STATES PATENT OFFICE 2,558,671

VALVE ASSEMBLY WITH SPHERICAL SHAPED VALVE ELEMENT HAVING A PASSAGE THERETHROUGH FOR COLLAPSIBLE TUBES

Henry H. Cherry, Houston, Tex.

Application July 17, 1947, Serial No. 761,705

1 Claim. (Cl. 222—507)

This invention relates to a valve assembly with spherical shaped valve element having a passage therethrough, for collapsible tubes.

An object of the invention is to provide an assembly of the character described which may be applied to a container to control the discharge of the contents of the container. It has been particularly designed for use in connection with containers in the form of tubes such as tubes for containing tooth paste, shaving cream and like contents.

It is a further object of the invention to provide a valve assembly that may be readily applied to, and detached from, the conventional type of tube.

It is a further object of the invention to provide a valve assembly embodying a spherical shaped valve having a passageway therethrough with a housing to snugly receive the valve and means for rotating the valve to open position in alignment with the container outlet or to closed position with both ends of the valve passageway sealed against the corresponding inside wall of the valve housing.

The invention also embodies stop means for limiting the movement of the valve toward open or closed position and which will reduce the stresses on the valve actuating mechanism.

A still further object of the invention is to provide in a valve assembly the type of valve hereinabove specified which is mounted to rotate on an axis which is not normal to the longitudinal axis of the tube to the end that the circular edge about the inlet end of the valve passageway will have a slicing effect, in closing the valve, on the contents being discharged.

The invention also embodies novel means for locking the valve in closed position.

Other objects and advantages will be apparent from the following specification which is illustrated by the accompanying drawings, wherein.

Figure 1:
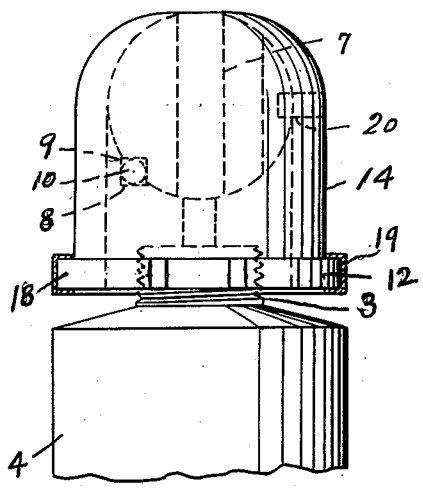
Figure 1 is a side elevation of the assembly shown mounted on a tube.

Referring now more particularly to the drawings wherein like numerals of reference designate the same parts in each of the figures, the numeral 1 designates the valve seat having an axial discharge passageway 2 therethrough and whose lower end is internally threaded to receive the externally threaded neck 3 of a conventional dispensing tube 4, such as a tube of tooth paste, shaving cream or the like.

The upper end of the seat is formed with a concaved seating face 5 against which the spherical valve 6 seats snugly.

This valve has a diametrical discharge passageway 7 which is in alignment with the passageway 2 when the valve is open.

Eccentric of the passageway 2 the seating face 5 is formed with a conical shaped recess 8 and registering with this recess 8 and in the surface of the valve 6 there is a similar recess 9 and in these recesses there is a pivot ball 10.

Opposite the ball 10 the valve 6 is formed with a side slot 11 which is parallel with the passageway 7.

Figure 4:
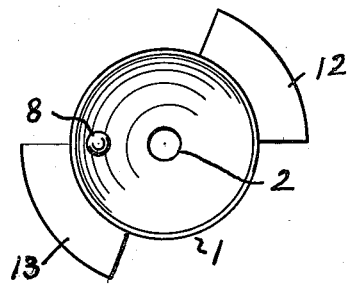
Figure 4 is a top plan view of the valve seat showing the valve retaining housing removed.
Figure 5:
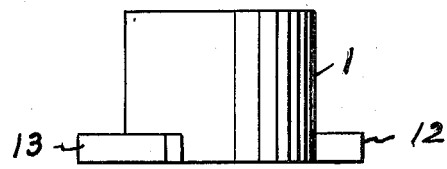
Figure 5 is a side view of the seat.

The base of the seat is also formed with the radial arcuate lugs 12, 13, as best shown in Figures 4 and 5.

Fitted over the valve 7 and valve seat 1 there is a housing 14 which is shaped cylindrical, at its base, to fit around the seat 1 and which, at its outer end, is concaved and of a curvature to fit snugly about the valve 6. This outer end has an outlet opening 15 which aligns with the passageway 7 when the valve is open, that is when the valve passageway 7 aligns with the seat passageway 2. This housing has the arcuate lower end faces 16, 16 which ride on the lugs 12, 13 and also has the depending arcuate lugs 17 and 18 which are extended radially and which are located between the lugs 12, 13, when the parts are assembled and said lugs 12, 13 are spaced apart a sufficient distance to allow a limited turning movement of the housing 14.

The lugs 12, 13 of the seat 1 are therefore circumferentially aligned with the lugs 17, 18 of the housing 14 and the parts are maintained assembled by means of a flexible open ring 19 which is channel shaped on the inner side and which may be sprung open and fitted over said registering lugs to maintain them in assembled relation and to allow them to turn relative to each other.

Fitted through one side of the housing 14 there is a pin 20 whose inner end projects into the slot 11.

Figure 2:
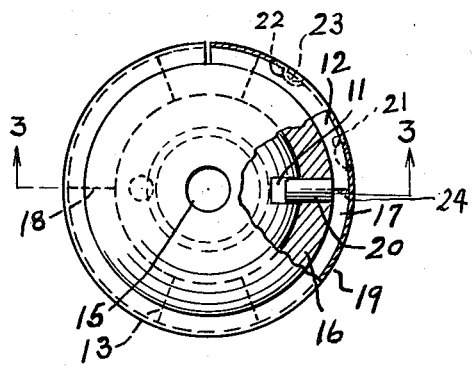
Figure 2 is a top plan view partly broken away and shown in section.
Figure 6:
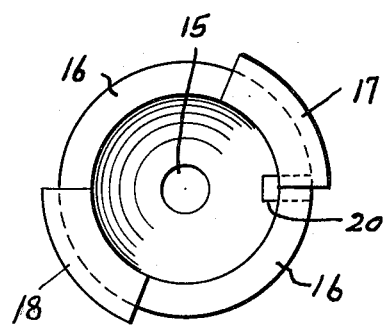
Figure 6 is a bottom end view of the valve housing.
Figure 3:
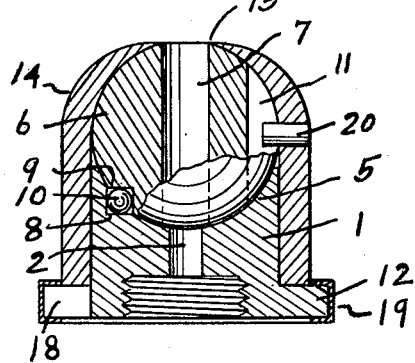
Figure 3 is a vertical, sectional view taken on the line 3—3 of Figure 2.

When it is desired to close the valve the housing 14 may be turned in a clockwise direction, as illustrated in Figure 2. This turning movement is continued until the forward ends of the lugs 17, 18 strike the opposing ends of the lugs 13, 12, respectively, whereupon such turning movement will be stopped. During this turning movement the valve 6 will also be turned, but the turning movement of the valve will be about a diametrical axis thereof which passes through the pivot ball 10 and therefore the ends of the valve passageway 7 will be carried out of alignment with the passageway 2 of the seat and the opening 15 of the housing to the end that both ends of the passageway 7 will be closed and seated against the curved inside surface of the seating face 5 and of the housing thus forming a double seal.

In order to open the valve the housing may be turned in a reverse direction until the lugs 17, 18 contact the opposing lugs 12, 13. The valve 6 will also be rotated, in reverse direction, about an axis passing diametrical through said valve and pivot ball 10 until the passageway 7 is again aligned with the passageway 2.

It will be noted from an inspection of Figure 2 that the external marginal surface of the lug 12 is provided with spaced recesses 21, 22 and the ring 19 is provided with an inside detent 23 which may be seated and thus temporarily locked, in either of said recesses.

The ring 19 also is provided with an inwardly turned lug 24 and when the detent 23 is seated in the recess 22 the lug 24 abuts against the opposite end of the lug 12. While in this position the valve may be freely operated as above explained. However, should it be desired to lock the housing 14 against accidental rotation the ring 19 may be turned until the detent 23 drops into the recess 21 and this will carry the locking lug 24 into position against the rear end of the housing lug 17 thus locking the housing against the rotation.

Figure 9:
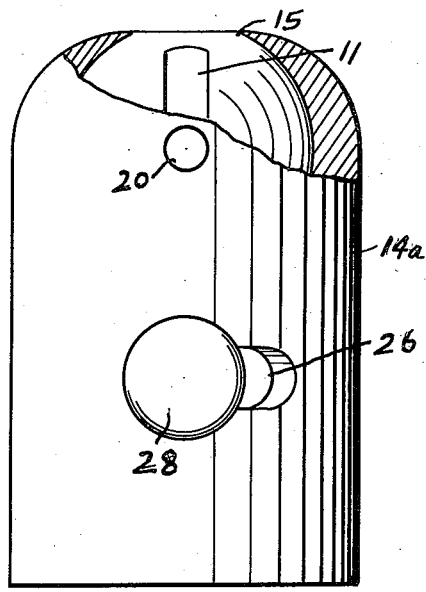
Figure 9 is a side view of the valve housing shown in Figure 7, partly in section, and taken at right angles to the view shown in Figure 7.
Figure 7:
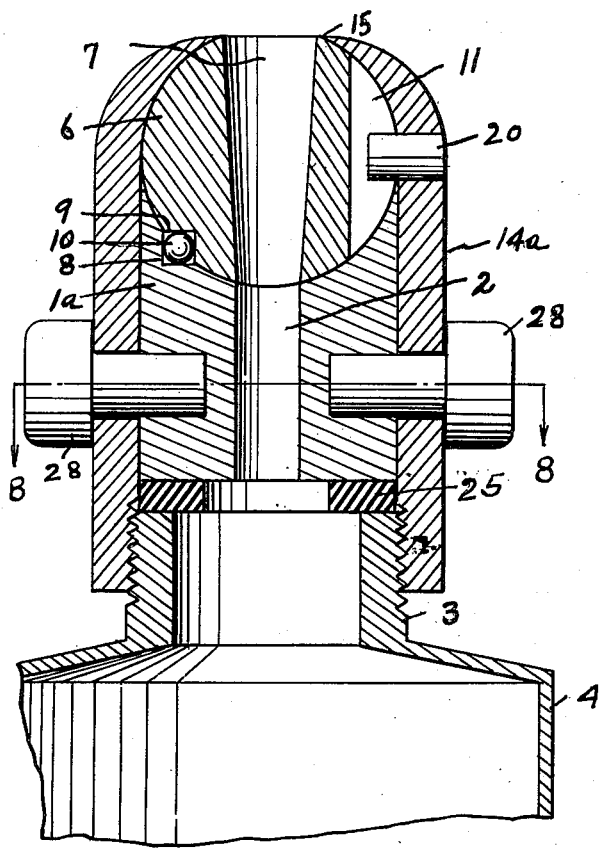
Figure 7 is a vertical, sectional view illustrating another embodiment of the invention.
Figure 8:
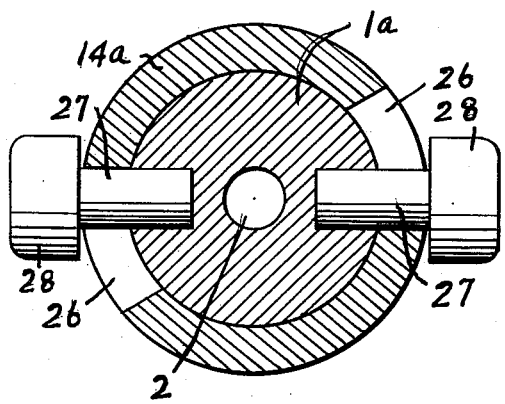
Figure 8 is a cross-sectional view taken on the line 8—8 of Figure 7.

In the embodiment illustrated in Figures 7 to 9, inclusive, the valve housing 14a is screwed directly onto the neck 3 of the tube 4 and the valve seat 1a is turnable in the housing.

In this form a resilient seal ring 25 is, preferably, located between the outer end of the neck 3 and the opposing end of the seat 1a. In this embodiment of the invention the valve 6 is provided with the discharge passageway 7 and the seat is provided with the outlet passageway 2, substantially as disclosed in the other embodiment just described, and the valve 6 of this embodiment also has a side slot 11 into which the pin 20 of the housing 14a projects.

The housing 14a is provided with opposed arcuate slots 26, 26 extending in a circumferential direction and there are pins 27, 27 which extend through said slots and are anchored to the valve 1a and are provided with enlarged heads 28, 28 on their outer ends which may be grasped and turned in a clockwise direction as seen in Figure 8 to close the valve and in an anti-clockwise direction to open the valve.

In this form of the invention in actuating the valve to open or closed position the valve seat will be turned and the housing will remain stationary so that when the valve seat is turned the pivot ball 10 will turn the valve 6 but the pin 20 will prevent the valve from turning about an axis normal to the axis of the outlet passageway 2 so that said valve will turn about an axis extending diametrically of the valve through said pivot ball 10 and this will cause the passageway 7 to move out of alignment with the passageway 2 and the outlet opening when the seat is turned in one direction and into such alignment when the seat is turned in the other direction.

The drawings and description are illustrative merely while the broad principle of the invention will be defined by the appended claim.

What I claim is:

A valve assembly comprising, a valve seat having a concaved seating face and a passageway for fluid, a radial lug on the seat, a spherical valve on said face and having a passageway for fluid, a housing fitted over the valve and about the seat, a lug on the housing circumferentially aligned with the seat lug, clamp means embracing said aligned lugs to maintain the housing and seat assembled, said housing and seat being relatively rotatable about a common axis and said lugs being spaced to limit the range of such rotation in either direction, a pivotal connection between the valve and seat which is eccentric with respect to said axis, an operative connection between the housing and valve effective to cause relative rotation between the valve and seat upon relative rotation between the housing and seat, said pivotal connection between the valve and seat being effective to cause said valve to rotate about a diametrical axis which passes through said connection to move the valve passageway into and out of alignment with the seat passageway.

HENRY H. CHERRY.

REFERENCES CITED

The following references are of record in the file of this patent:

UNITED STATES PATENTS

| Number | Name | Date |
|---|---|---|
| 133,215 | Endicott | Nov. 19, 1872 |
| 1,747,550 | Klimburg | Feb. 18, 1930 |
| 2,023,230 | Hutton | Dec. 3, 1935 |

FOREIGN PATENTS

| Number | Country | Date |
|---|---|---|
| 736,015 | France | Sept. 12, 1932 |